United States Patent [19]

Dahlem

[11] 4,213,385
[45] Jul. 22, 1980

[54] SCRAP SHEARING MACHINE

[75] Inventor: Peter Dahlem, Hilden, Fed. Rep. of Germany

[73] Assignee: Lindemann Maschinenfabrik GmbH, Düseldorf, Fed. Rep. of Germany

[21] Appl. No.: 905,982

[22] Filed: May 15, 1978

[30] Foreign Application Priority Data

Sep. 3, 1977 [DE] Fed. Rep. of Germany ....... 2739825

[51] Int. Cl.² .............................................. B30B 9/32
[52] U.S. Cl. ....................................... 100/95; 83/176; 100/295
[58] Field of Search .................. 100/98 R, 232, 94, 95, 100/295; 83/150, 176, 923

[56] References Cited

U.S. PATENT DOCUMENTS

| | | | |
|---|---|---|---|
| 3,101,045 | 8/1963 | Van Endert | 100/95 |
| 3,141,401 | 7/1964 | Lindemann et al. | 100/98 R |
| 3,945,315 | 3/1976 | Dahlem | 100/95 |

*Primary Examiner*—Billy J. Wilhite
*Attorney, Agent, or Firm*—Toren, McGeady and Stanger

[57] ABSTRACT

A scrap shearing machine of the kind comprising an upper knife support which has an upper knife fixed to it and is vertically movable in a frame, a stationary lower knife and optionally also a vertically movable tamper, which is mounted immediately upstream of the cutting plane of the shearing machine, is provided with a bending plunger which acts on the scrap downstream of the cutting plane of the shearing machine. The bending plunger is movable in the frame in advance of the upper knife so that it comes into contact with the scrap before the upper knife comes into contact with the scrap. Preferably the bending plunger is fixed to an underface of the upper knife support and is inclined across the machine substantially parallel to the cutting edge of the upper knife.

5 Claims, 4 Drawing Figures

SCRAP SHEARING MACHINE

This invention relates to shearing machines of the kind comprising an upper knife support which has an upper knife fixed thereto and is vertically movable in a frame, a stationary lower knife and optionally also a vertically movable tamper mounted immediately upstream of the cutting plane of the shearing machine in relation to the direction in which the scrap is fed to the machine.

In the course of general rationalisation, the shearing results of scrap shearing machines are assessed not only in the light of the shearing performance achieved, but also in the light of the degree of compaction of the cut scrap which can be achieved by means of a compacting device which acts on the scrap after it has been cut by the shearing machine. The compaction achievable after shearing is of great significance in that the sheared scrap must frequently be transported from the scrapping location over great distances to a steelworks where the metal scrap is further processed. The higher the packing density achieved as a result of the operation of the shearing machines, the greater the quantity of scrap that can be contained, for instance, in a railway wagon, a factor which has a considerable influence upon the transportation costs.

In known scrap shearing machines, for example in the machine disclosed in British Specification No. 1,498,518, it is usual for the scrap which is to be sheared to be first thrown into a feed channel disposed in front of the machine and to be compacted there into a horizontally extending column of scrap by means of a lateral pressing plunger and/or by means of pivotal pressing covers fitted to the channel. This column is then pushed step by step through the shearing machine to cut it up and the column undergoes, ahead of the shearing plane, further compaction by means of a tamper which is lowered on to the column from above. The tamper acts on the column of scrap as a holding-down device during each shearing stroke of the upper knife. Well-compacted sheared scrap can be obtained by means of the known machine. It has however now been found especially in the shearing of scrap consisting of pieces of mixed shapes and sizes, that during the shearing operation the previous compaction in the feed channel and that effected by the tamper is to a great extent lost, because the front end of the scrap column is opened out fanwise by the forces which act upon the scrap in the vicinity of the shearing knives.

The aim of the present invention is to provide a scrap shearing machine of the kind described above, wherein the shearing operation is carried out without appreciably adversely affecting any previous compaction, and in which it is possible not only to cut scrap metal sections, in particular those of large area such as I-beams, into short pieces, but also to compact them or deform them to reduce their bulky nature, which would otherwise lead, in heaps of scrap, to an undesirably large number of cavities.

To this end, according to this invention, we provide a scrap shearing machine, comprising a frame, an upper knife support which has an upper knife fixed thereto and is vertically movable in the frame, and a stationary lower knife fixed in the frame, wherein a bending plunger is provided to act on the scrap on the side of the upper knife remote from the lower knife, that is downstream of the upper knife in the direction of movement of the scrap through the machine, the bending plunger being movable in the frame in advance of the upper knife so that it comes into contact with the scrap before the upper knife comes into contact with the scrap.

With this arrangement the result is achieved that the bending plunger, just before shearing starts, comes into contact with the upper face of the free end of the column of scrap which projects through the mouth of the machine, that is between the upper and lower knives, and exerts a bending force upon the end which is about to be cut off. This force prevents the undesired "springing open" of the end face of the column of scrap, as a result of the loading of the scrap by the knives. Even without any previous compaction carried out by a tamper, the bending plunger achieves surprising advantages. Thus, the bending loading produced by the plunger is noticeably advantageous particularly in the cutting of solid scrap, since by its effects fairly brittle materials are frequently broken through as soon as the upper knife comes into contact with them, so that the shearing operation can be carried out with a smaller shearing force and less wear of the machine. If a "drawing cut" is used, as is common in the majority of existing scrap shearing machines, and the bending plunger is disposed approximately parallel to the upper knife which is transversely inclined across the machine to produce the drawing cut, the plunger exerts simultaneously both a vertical and a horizontal force component on the scrap to be cut. This horizontal component of force leads, together with the vertical compressive forces, to I-beams and similar sections being so compacted that their flanges are displaced parallel to one another. This tends to break the webs of the beams and in many cases the flanges come so close to one another that a relatively dense stratification of flange-web-flange results. Thus with the machine in accordance with the present invention a relatively dense heap of scrap can be produced even with material such as I-beams.

In order to save having to provide an additional drive for the bending plunger, the plunger is with advantage fixed to the upper knife support and preferably is fixed directly to a lower face of the upper knife support.

An example of a scrap shearing machine in accordance with the invention is illustrated in the accompanying drawings, in which.

Figure 1:
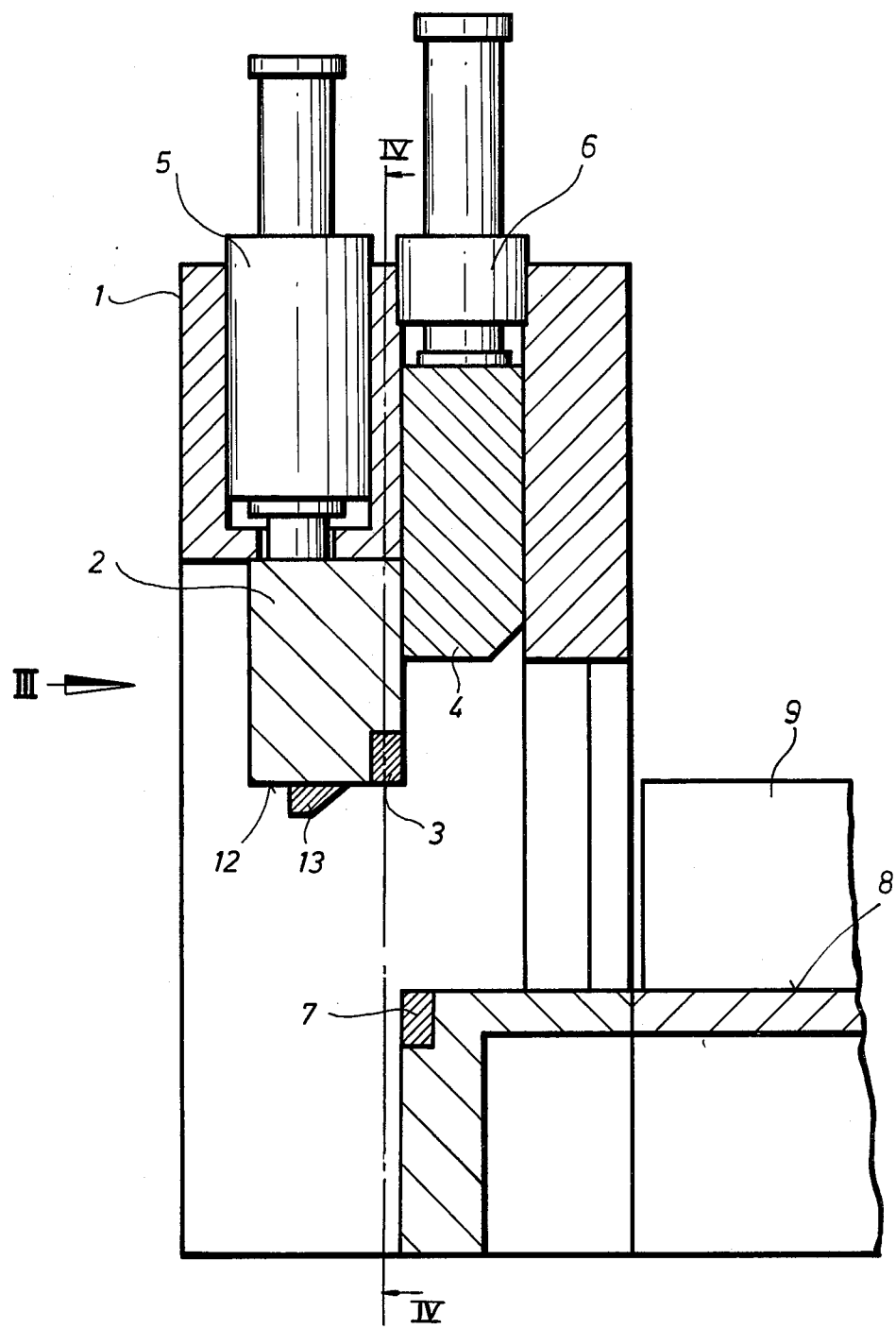
FIG. 1 is a diagrammatic sectional side view of the machine with the upper knife support in a raised position.

The machine illustrated comprises a frame 1, which forms a mounting and guide both for an upper knife support 2 carrying an upper knife 3 and also for a tamper 4. The upper knife support 2 and the tamper 4 are each connected to a double-acting hydraulic ram, 5 and 6 respectively. Opposite to the upper knife 3, a stationary lower knife 7 is mounted in the frame 1. In front of the frame 1 is an upwardly open feed channel 8, one side wall 9 of which is formed, in a known manner, as a lateral pressing plunger, which compacts scrap thrown into the channel 8 to form a column of scrap 10 having the same width b (FIG. 3) as the mouth of the machine. A pusher, not shown, acting in the direction of an arrow 11 pushes the scrap column 10 step by step through the mouth of the machine formed between the tamper 4 and the lower knife 7 and bounded laterally by side members of the frame 1. Before the start of each shearing stroke, the tamper 4, which is not absolutely essential to enable the machine to operate, descends on to the scrap column and thereby produces a vertical compaction of the section of the scrap column which is cut off in the shearing stroke after the next forward movement of the column. During the shearing stroke following the compaction, the tamper is held in the lowered position and acts as a holding-down device for the scrap. If no tamper is provided, then the shears is provided with a device which only acts to hold down the scrap.

Figure 2:
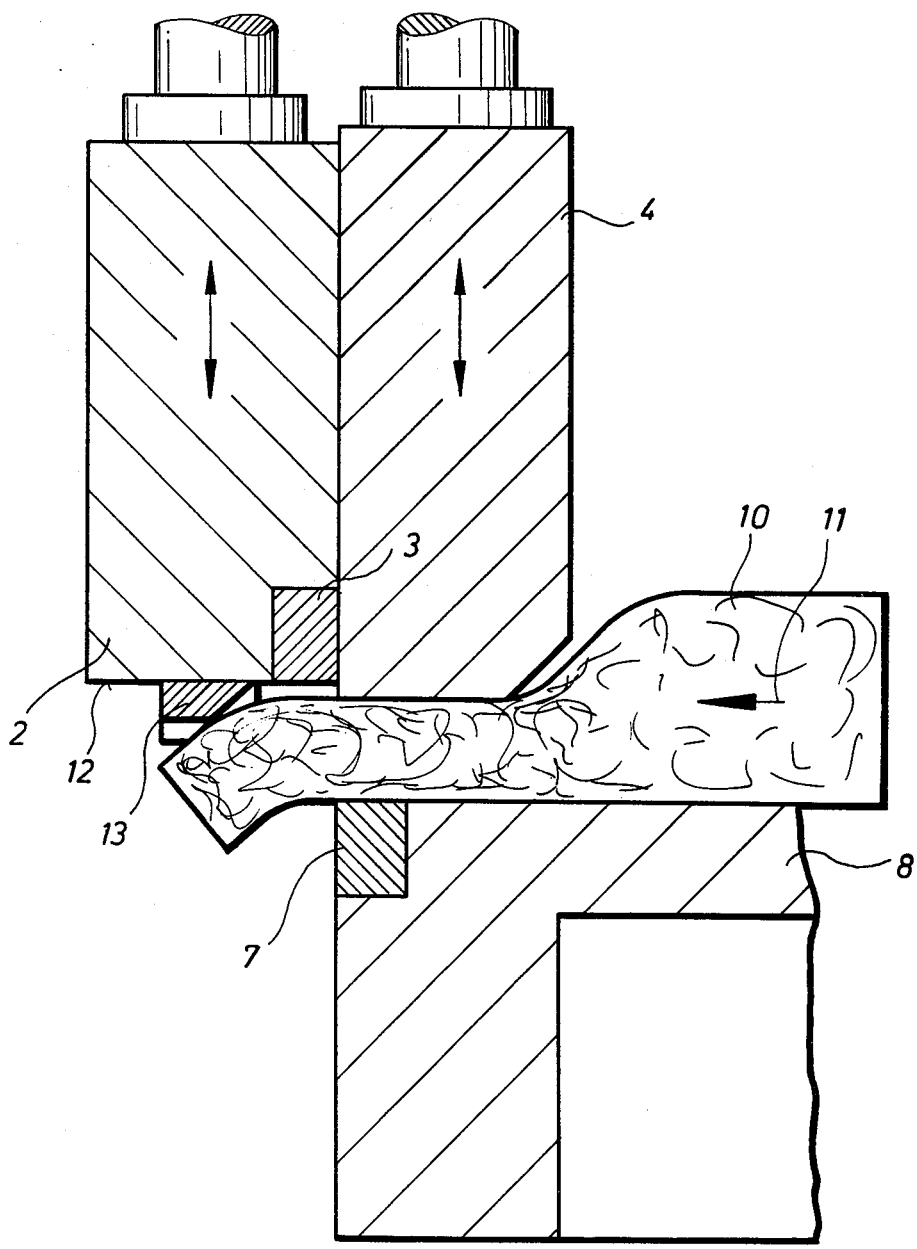
FIG. 2 is a view to a larger scale similar to part of FIG. 1 but showing the upper knife support descending and just before cutting starts.
Figure 3:
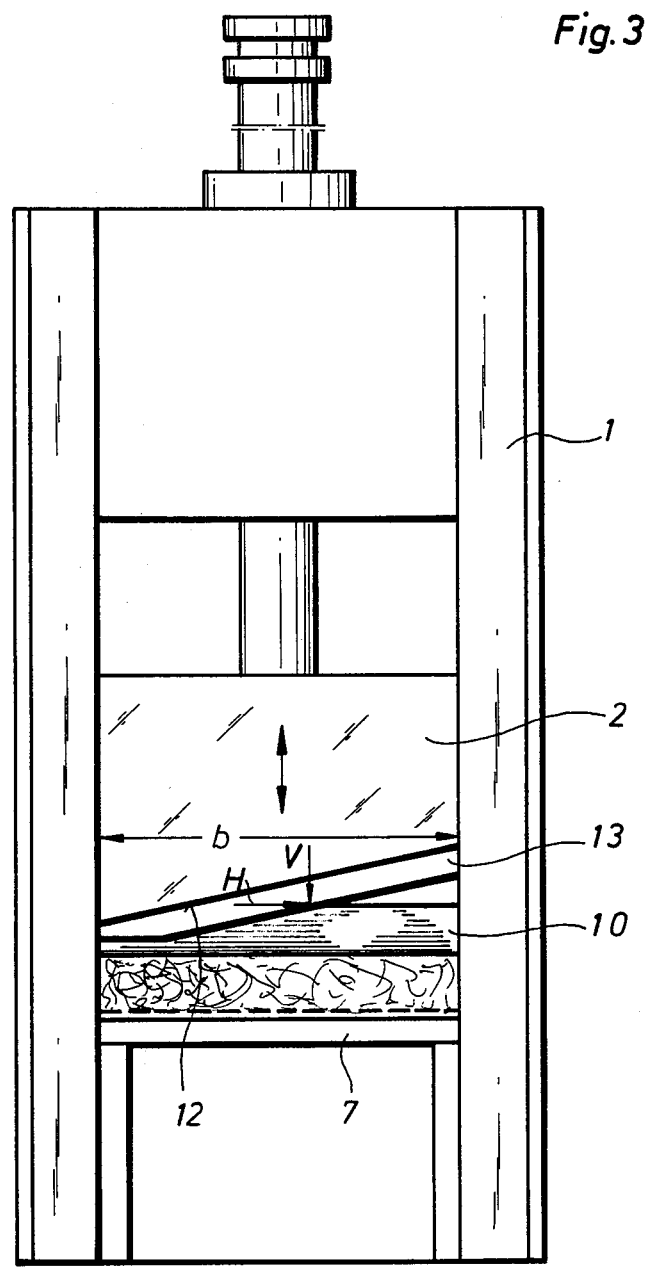
FIG. 3 is a rear view of the machine in the direction of the arrow III shown in FIG. 1, but with the upper knife support in the position of FIG. 2.
Figure 4:
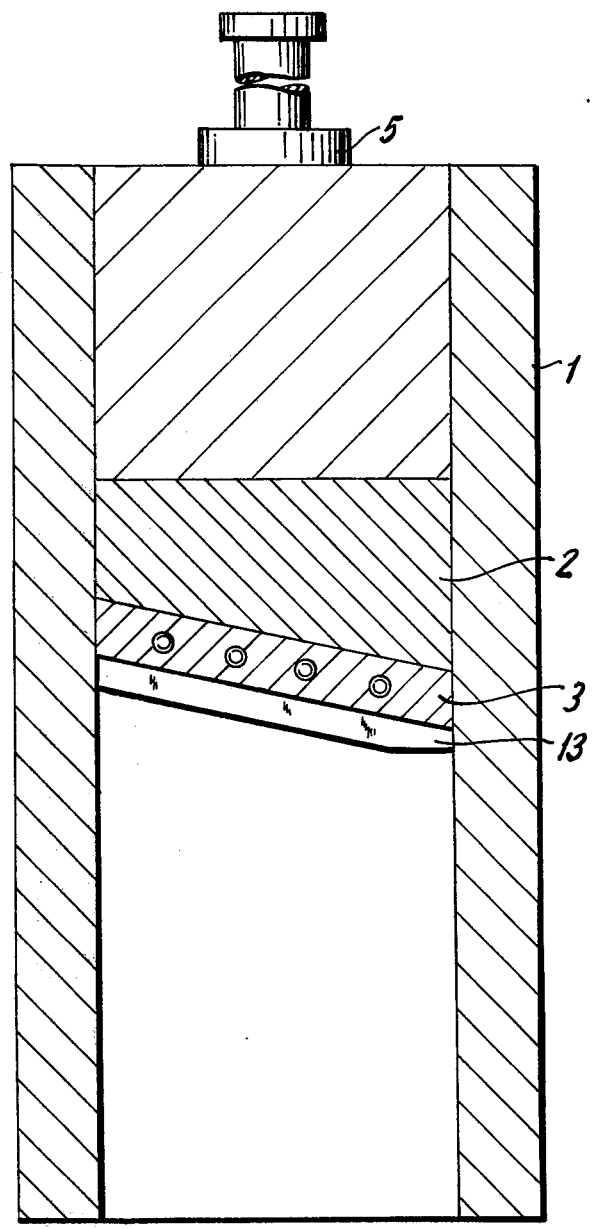
FIG. 4 is a sectional view of the machine showing the shape of the upper knife.

On a lower face 12 of the upper knife support 2, a bending plunger 13 is fixed. The plunger 13 extends across the entire width of the mouth of the machine and is located in such a manner that, when the upper knife support descends as shown in FIGS. 2 and 3, the bending plunger 13 bears down upon the free end of the clamped portion of the scrap column 10 which projects through the mouth of the shears, before the upper knife 3 comes into contact with the column. In this manner, the free end of the scrap column is always maintained under pressure during each shearing stroke. This prevents or inhibits it from springing open fanwise under the effect of the forces acting on the scrap in the vicinity of the shearing knives. Instead the column retains the deformation imparted to it by the tamper and the wall 9 in the manner which is the purpose of the present invention.

Preferably, the bending plunger 13 is mounted obliquely with a transverse inclination in a manner corresponding to that of the upper knife 3 which operates with a drawing cut. Thus the plunger 13 in addition to producing a vertical bending force V, also exerts a horizontal force component H (see FIG. 3) in the direction of shearing upon the scrap being sheared. This is especially favourable when cutting up steel sections, such as I-beams, in that it favours compaction of the sections. This is because a parallel transverse displacement of the flanges of such sections relative to one another takes place. This can produce such an intense loading at the junctions between the flanges and the web of the section that the flanges become loosened from the web and, under the action of the force V, come to rest one above another in a vertical stratification of flange-web-flange.

I claim:

1. A scrap shearing machine comprising a frame, an upper knife support, means mounting said upper knife support for upward and downward movement in said frame, an upper knife fixed to said upper knife support, a stationary lower knife and means fixedly mounting said stationary lower knife in said frame for coaction with said upper knife in a shearing plane, a bending plunger, means mounting said bending plunger in said frame for upward and downward movement on the side of said upper knife remote from said lower knife, and means for moving said bending plunger, said upper knife support and said upper knife upwards and downwards in said frame to act on scrap fed to said machine and protruding between said upper knife and said lower knife, said means for moving said bending plunger being operative to move said bending plunger downwards in advance of downward movement of said upper knife whereby said bending plunger comes into contact with said scrap before said upper knife comes into contact with said scrap.

2. A machine as claimed in claim 1, further comprising a tamper, means mounting said tamper for vertical movement in said frame on the side of said lower knife upstream relative to the feed direction of said scrap and means for moving said tamper to act downwardly on said scrap.

3. A machine as claimed in claim 1, further comprising means fixing said bending plunger to said upper knife support, whereby said means for moving said upper knife support is also operative to move said bending plunger.

4. A machine as claimed in claim 3, wherein said bending plunger is fixed to an underface of said upper knife support.

5. A machine as claimed in claim 3, wherein said upper knife includes means defining a cutting edge, said cutting edge being transversely inclined across said machine and wherein said bending plunger is transversely inclined across said machine substantially parallel to said cutting edge of said upper knife.

* * * * *